(12) United States Patent
Dahlheimer

(10) Patent No.: US 7,431,304 B2
(45) Date of Patent: Oct. 7, 2008

(54) FACE SEAL WITH CONSTRICTION RING

(75) Inventor: John C. Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 25 days.

(21) Appl. No.: 11/282,079

(22) Filed: Nov. 17, 2005

(65) Prior Publication Data

US 2007/0108705 A1    May 17, 2007

(51) Int. Cl.
  *F16J 15/34* (2006.01)
  *F16J 15/38* (2006.01)
(52) U.S. Cl. .................. 277/370; 277/371; 277/391
(58) Field of Classification Search ......... 277/369–371, 277/377, 389, 390–391
  See application file for complete search history.

(56) References Cited

U.S. PATENT DOCUMENTS

| 2,521,137 A | * | 9/1950 | Vedovell | 277/391 |
|---|---|---|---|---|
| 2,769,390 A | * | 11/1956 | Heimbuch | 415/111 |
| 2,888,280 A | * | 5/1959 | Meyer et al. | 277/391 |
| 3,997,805 A | * | 12/1976 | Dochterman | 310/90 |
| 4,095,808 A | * | 6/1978 | Glasson | 277/372 |
| 4,136,885 A | * | 1/1979 | Uhrner | 277/374 |
| 4,415,167 A | * | 11/1983 | Gits | 277/373 |
| 5,797,602 A | * | 8/1998 | Less | 277/372 |

* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A face seal is provided with a constriction ring around a rubber boot that constricts the normal outward bulging of the flex section of the rubber boot as it folds and tries to roll forward over itself during axial deflection. The constriction caused by the constriction ring provides for increased frictional hysteresis during compression and decompression of the boot flex section. This increased hysteresis increases the dampening capacity of the seal design and, therefore, reduces undesired vibrations and seal noise generation.

20 Claims, 5 Drawing Sheets

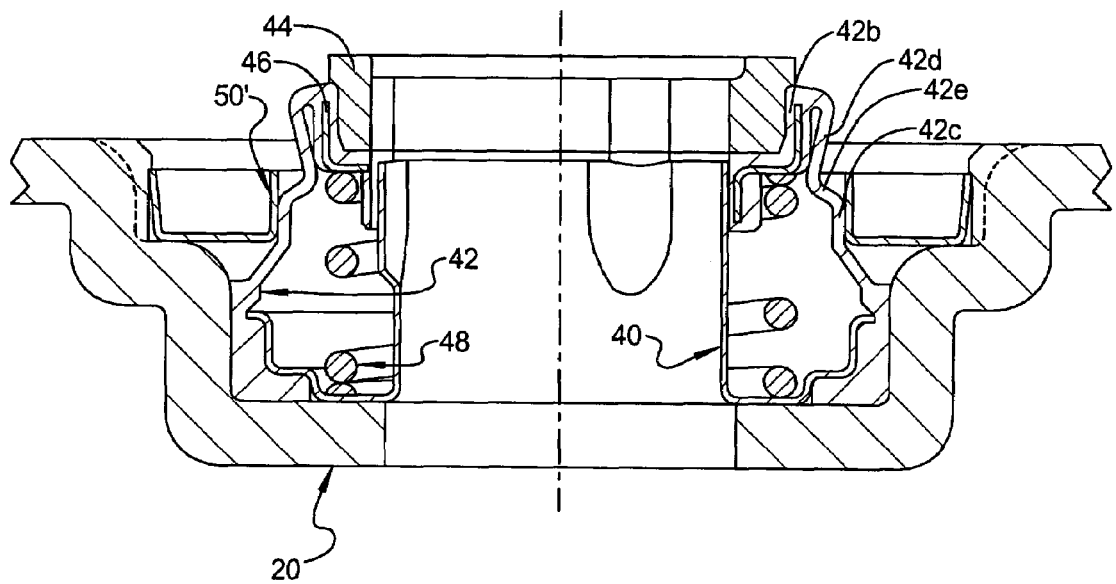
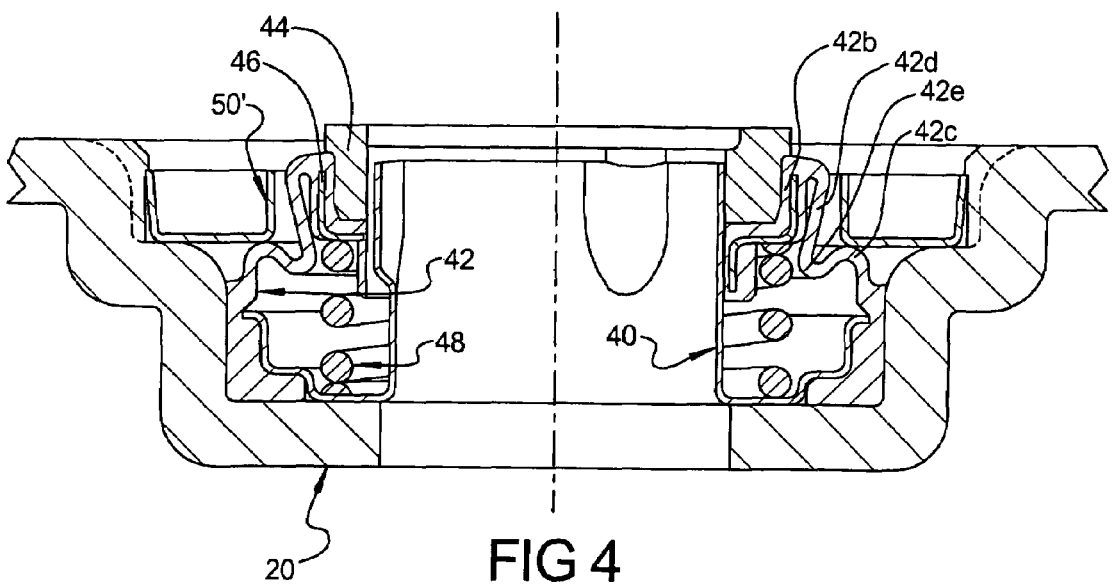

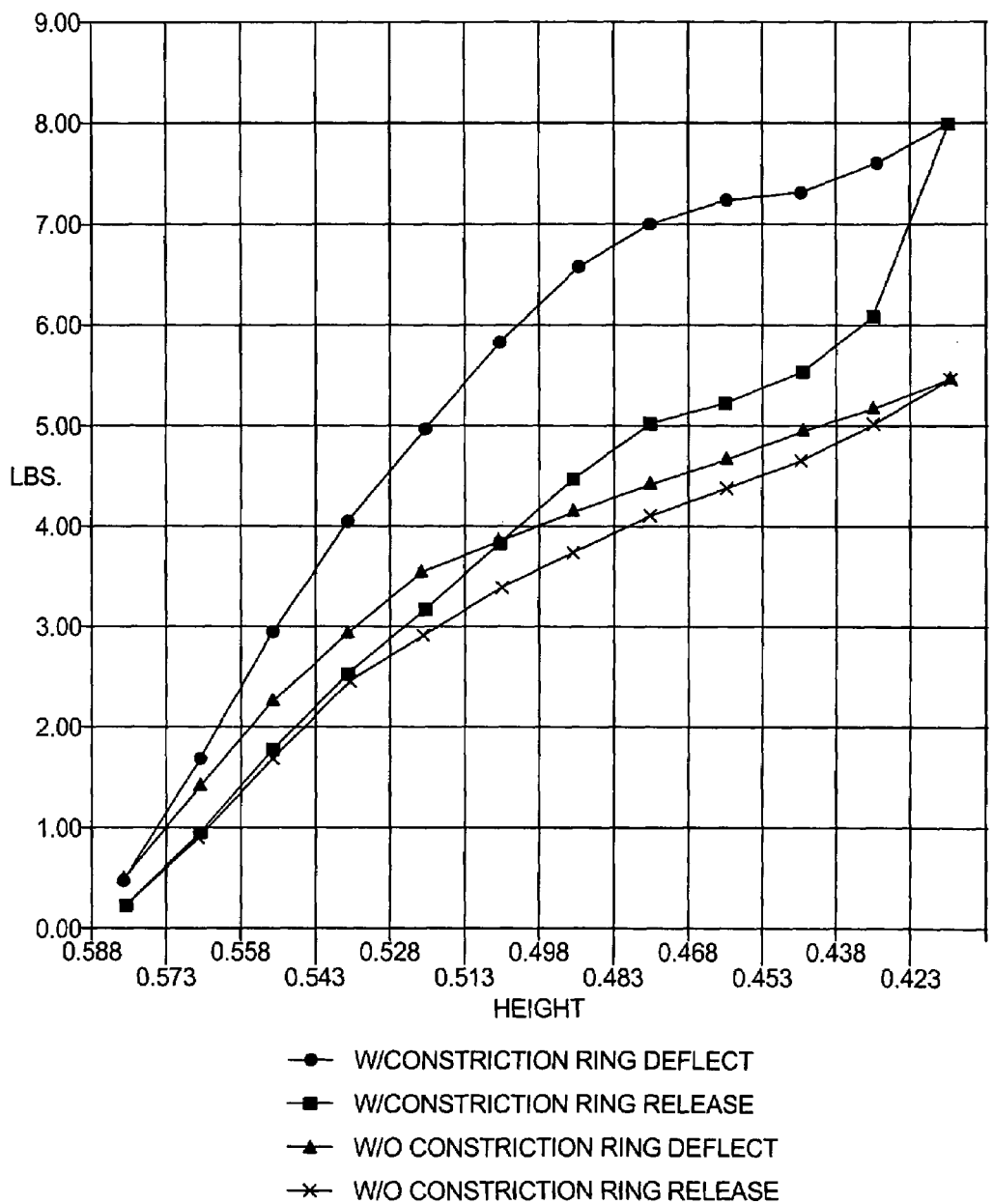

FACE SEAL WITH CONSTRICTION RING

FIELD OF THE INVENTION

The present disclosure relates in general to shaft seals, and more particularly, to mechanical face seals employed with rotating shafts.

BACKGROUND AND SUMMARY OF THE INVENTION

A mechanical face seal, which may be employed, for example, in a dishwasher pump, may include a stationary seal head assembly that mates with, and seals against, a rotating seal seat assembly. Typically, the seal seat assembly mounts to an impeller that is driven via a shaft by a motor. It is common for the impeller to be made of a plastic material. Such a conventional face seal assembly performs very well at sealing out water, and prevents the impeller from overheating because the water adjacent to the seal absorbs frictional heat generated by the seal. A rubber bellows or boot of the seal head assembly provides an axially flexible sealing membrane between the seal ring and the pump housing. A spring biases the seal ring against the seal seat. A concern with these conventional face seals is that a vibrating seal ring can emit annoying, loud seal squealing, squeaking, ringing, chirping, or moaning noises, especially sealing water-based fluids at elevated temperatures or under marginal lubrication.

Thus, it is desirable to have a face seal for a rotating shaft that will adequately seal water, and can also significantly reduce the vibration of the seal ring to prevent annoying, loud noises from being generated.

Accordingly, the present disclosure provides the rubber bellows or boot-type mechanical face seal with a constriction ring that constricts the normal outward bulging of the flex section of the rubber boot as it folds and tries to roll forward over itself during axial deflection. This constriction causes increased frictional hysteresis during compression and decompression of the boot flex section. The increased hysteresis, defined as the difference between the load/deflection curve resulting from axially compressing the seal from its free height to near its solid height and the load/deflection curve resulting from releasing the seal from near its solid height to its free height, increases the dampening capacity of the seal design four to six fold, or more, compared to conventional non-constricted designs. The increased dampening action suppresses high frequency frictional stick-slip vibrations between the rotating and stationary rubbing seal components, thus suppressing high frequency vibrations of the seal ring to prevent annoying noise generation.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a cross-sectional view of an alternative seal assembly design shown in an uncompressed state;

FIG. 4 is a cross-sectional view of the seal assembly shown in FIG. 3 after compression of the seal assembly to an operating height;

FIG. 7 is a graph of the difference in the load/deflection curves obtained on a seal with and without the constriction ring, according to the principles of the present disclosure.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
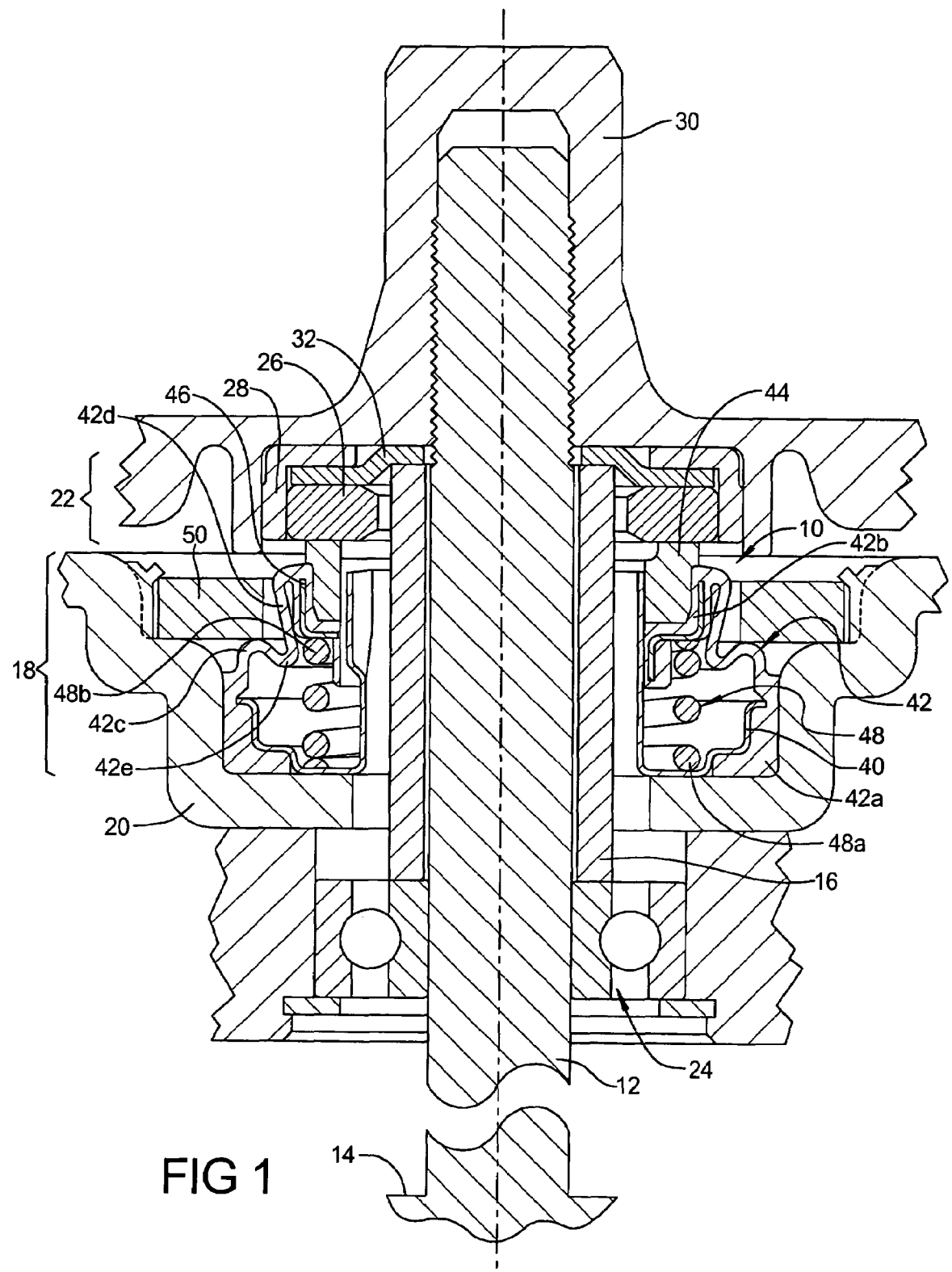
FIG. 1 is a cross-sectional view of a seal assembly according to the principles of the present disclosure.

With reference to FIG. 1, a mechanical face seal assembly 10 is mounted about a rotatable shaft 12. The rotatably shaft 12 may be driven by, for example, a pump motor 14 in an automatic dishwasher, although the seal assembly 10 may be employed in other types of sealing applications for a rotatable shaft 12. The shaft 12 includes a shaft sleeve 16 mounted thereon. As an alternative to a shaft sleeve 16, the shaft 12 may have a shoulder formed thereon.

The seal assembly 10 includes a seal head assembly 18, mounted stationary relative to a pump housing 20, and a seal seat assembly 22, rotationally fixed to the shaft 12. A bearing 24 mounts to the shaft 12 with an inner race thereof abutting the shaft sleeve 16. The seal seat assembly 22 includes a seal seat 26 which abuts against the seal head assembly 18. A grommet 28 abuts against an impeller 30 and a washer 32 is captured between the grommet 28 and seal seat 26. The impeller 30 is preferably threaded onto the motor shaft 12, which clamps the washer 32 against the sleeve 16.

The seal head assembly 18 is press-fitted into the pump housing 20 by means of a spring seat 40. A rubber boot or bellows 42 includes a mounting portion at a first end 42a disposed between the spring seat 40 and housing 20. A second end 42b of the rubber boot 42 is disposed against a seal ring 44 and includes a retaining ring 46 disposed therein in order to provide a clamping fit with the seal ring 44. A spring 48 has a first end 48a disposed against the spring seat 40 and a second end 48b disposed against the second end 42b of rubber boot 42 which biases the seal ring 44 against the seal seat 26 of the seal seat assembly 22.

Figure 5:
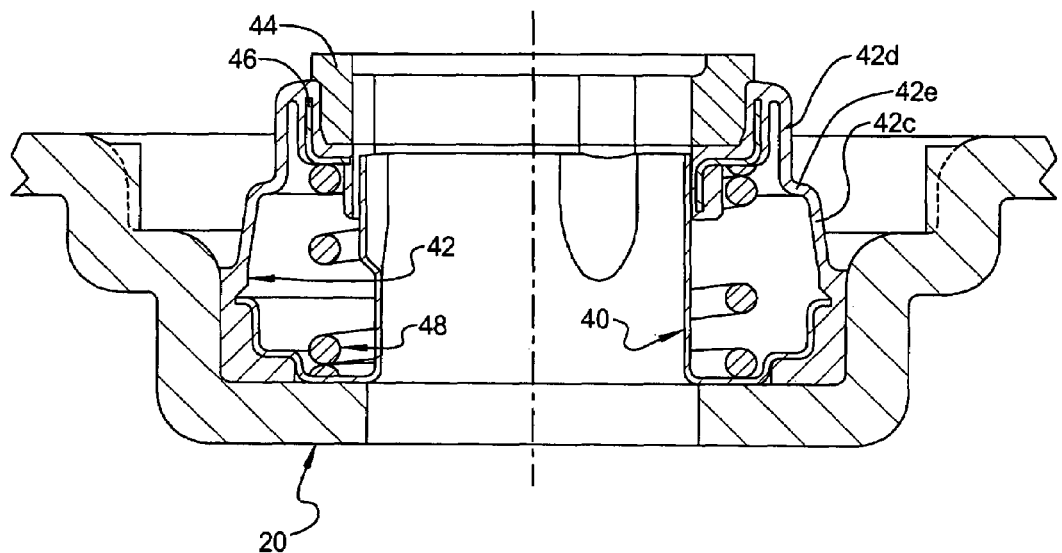
FIG. 5 is a cross-sectional view of a conventional seal assembly before compression.
Figure 6:
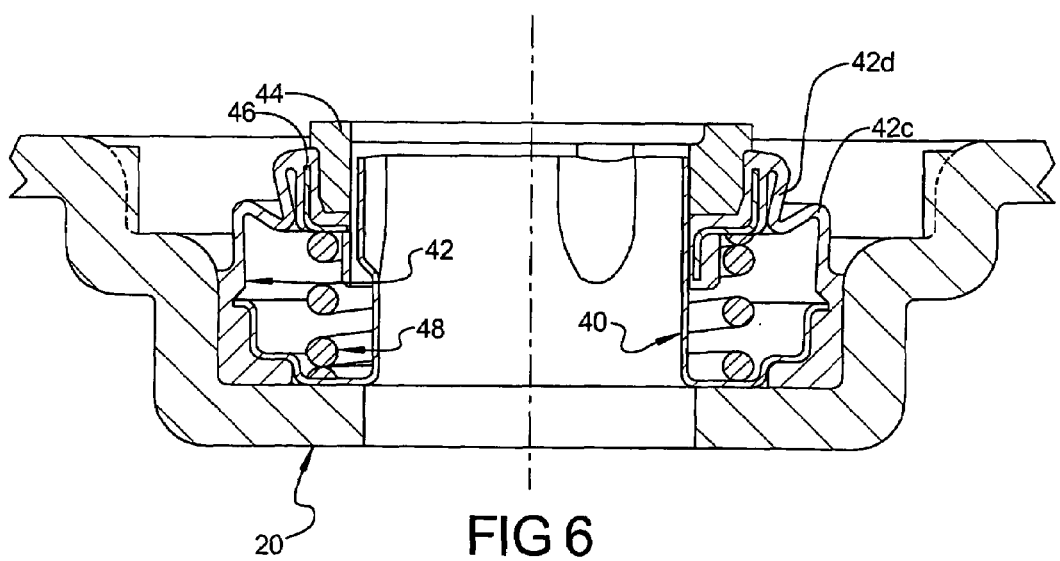
FIG. 6 is a cross-sectional view of the seal assembly shown in FIG. 5 with the seal assembly shown in compression.

A constriction ring 50 surrounds the annular rubber boot 42 and is mounted to the housing portion 20. The constriction ring 50 can be formed of solid plastic, metal, or other materials. In addition, as shown in FIG. 3 and 4, the constriction ring 50' can also be made of stamped sheet metal. The constriction ring 50 constricts the normal outward bulging of the flex section 42c, 42d, 42e of the rubber boot 42 as it folds and tries to roll forward over itself during axial deflection. This constriction causes increased frictional hysteresis during compression and decompression of the boot flex section 42c, 42d, 42e. This increased hysteresis, defined as the difference between: the load/deflection curve resulting from axially compressing the seal from its free height to near its solid height and the load/deflection curve resulting from releasing the seal from near its solid height to its free height, increases the dampening capacity of the seal design four to six fold, or more compared to conventional non-constricted designs, as illustrated in FIG. 5 and 6. This increased dampening action suppresses high frequency frictional stick-slip vibrations between the rotating and stationary rubbing seal components that, if inadequately suppressed, cause the vibrating seal ring to emit annoying, loud seal squealing, squeaking, ringing, chirping, or moaning noises, especially when sealing water-based fluids at elevated temperatures.

Figure 2:
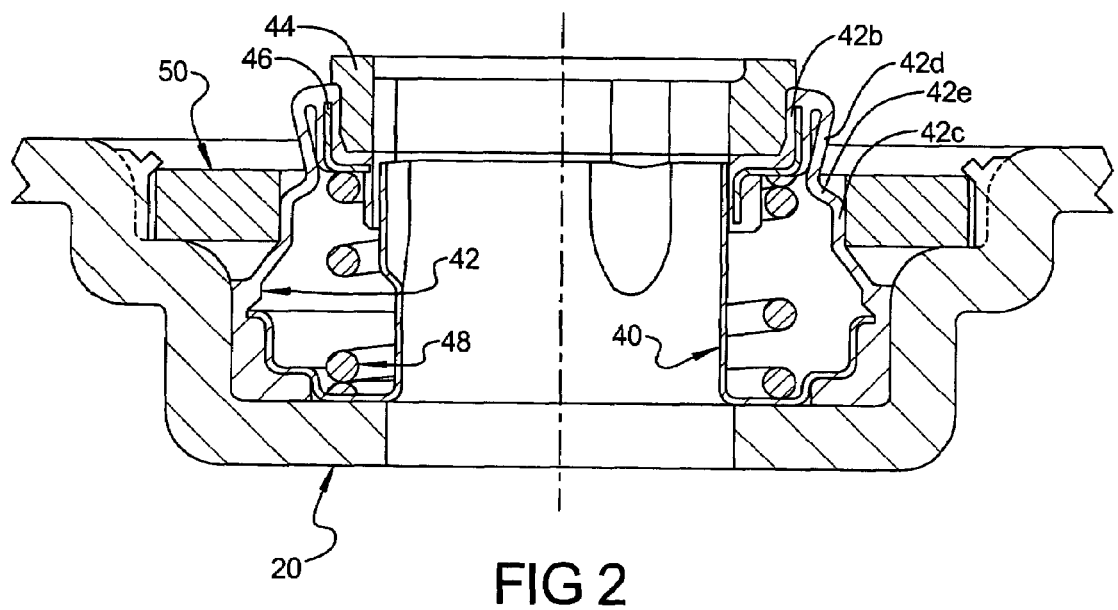
FIG. 2 is a cross-sectional view of the seal assembly shown in FIG. 1 illustrating the spring and bellows before compression to an operating height.

In a preferred construction, the rubber boot flex section consists of a larger tubular section 42c (having a diameter longer than an inner diameter of the constriction ring 50) and a smaller tubular section 42d (having a diameter smaller than an inner diameter of the constriction ring 50) joined by an interconnecting tubular portion 42e having an S-shaped cross-section. During axial compression of the boot, the larger tubular portion 42c normally bulges outwardly as it folds and rolls over the smaller tubular portion 42d, as illustrated in FIGS. 5 and 6. However, in the system of the present disclosure, the larger tubular portion 42c is constricted and squeezed inwardly by the constriction ring 50, as shown in FIGS. 2 and 3, preventing the larger tubular portion 42c from bulging outward. This, in turn, causes the smaller tubular portion 42d to also be deflected radially inward until this portion is compressed against the metal reinforced head portion 42b of the boot into which the seal ring 44 is press fitted. Further axial compression of the boot 42 causes the inwardly constricted larger tubular portion 42c of the flex section to slide axially against and out of the inner diameter of the constriction ring 50, around the inner rear corner and outward against the rear wall surface of the constriction ring as shown in FIGS. 1 and 4. This sliding movement between the boot flex section 42c and the inner diameter, corner, and rear wall surfaces of the constriction ring 50 creates friction between the two. This external rubbing friction, in addition to the normal internal friction of the boot walls being flexed and snaked around the constriction ring 50, adds to the normal forces resisting seal compression. In a similar manner, when the seal is decompressed, the resulting external sliding friction between the boot walls and the rear wall, inner rear corner and inner diameter of the constriction ring 50, plus the normal, internal friction of the boot wall being flexed and snaked around the constriction ring 50, subtracts from the stored forces normally available to decompress the seal. The resulting greater differences between compression forces and decompression forces in a seal operating with a constriction ring 50, compared to a seal operating without a constriction ring, is shown in the graph illustrated in FIG. 7 which illustrates that the constriction ring provides increased hysteresis and dampening properties that better suppress high frequency vibrations of the adjacent seal ring 44 that, if not adequately suppressed, would generate annoying noises.

The constriction ring 50 is axially fixed to the housing portion 20 either by a diametrical cross-fit between the outside diameter of the constriction ring and an inner counterbore or inner surfaces of protruding lugs in a counter-bore provided in the housing portion 20. Alternatively, heat melting and inward spreading of the melted lug tips around the front outer corner of the constriction ring 50 can also be utilized to hold the constriction ring in place.

The constriction ring 50, 50' can take alternative shapes, such as a plain washer as shown in FIGS. 1 and 2, or even metal stamping as shown in FIGS. 3 and 4, as long as they provide an inner diameter of suitable length and rear wall of suitable radial width to accommodate the axial and radial travel of the seal boot flex section portions 42c-42e, which it generally constricts. In the preferred construction, the rubber boot 42 will be made of an O-zone resistant rubber compound. The restriction ring can be made of a rigid thermoplastic or thermoset plastic material, or a composition of materials such as rubber and a rigid material, or of a metal, such as aluminum, stainless steel, brass, or plated steel, or any other material rigid enough to be held in place when affixed to the pump housing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A face seal assembly for a rotatable shaft, the face seal assembly comprising:
    a seal seat assembly configured to be mounted to a rotatable shaft;
    a seal head assembly including:
       a spring seat;
       a spring having a first end disposed against said spring seat;
       an annular seal ring biased against said seal seat assembly by said spring;
       a flexible annular boot mounted relative to said spring seat and providing a sealed connection to said seal ring, said boot having an axial length; and
       a constriction ring engaging with and surrounding said annular boot, said constriction ring having an axial length between a first end and a second distal end less than said axial length of said boot, and said constriction ring engaging an axially extending portion of said annular boot,
    wherein said constriction ring is entirely exterior to said spring.

2. The face seal assembly according to claim 1, wherein said constriction ring is configured to be mounted against a shoulder portion of a housing.

3. The face seal assembly according to claim 1, wherein said constriction ring is formed of solid metal.

4. The face seal assembly according to claim 1, wherein said constriction ring is formed from sheet metal.

5. The face seal assembly according to claim 1, wherein said constriction ring is formed from plastic.

6. The face seal assembly according to claim 1, wherein said constriction ring is configured to be mounted in a bore of a housing.

7. The face seal assembly according to claim 1, wherein said constriction ring is configured to be mounted into a housing having retaining projections.

8. The face seal assembly according to claim 1, wherein said constriction ring has an innermost diameter equal to or larger than a tubular flexible portion of said annular boot in a non-compressed state, but restricts the normal outward bulging and folding of some flexible portions of said annular boot when said annular boot is compressed to a normal operating position.

9. The face seal assembly according to claim 1, wherein said constriction ring has an inner diameter that is smaller than a tubular flexible portion of said annular boot in a non-compressed state, and restricts and prevents normal outward bulging and folding of some flexible portions of said annular boot when said annular boot is axially compressed to a normal operating position.

10. A face seal assembly for a rotatable shaft, the face seal assembly comprising:
    a seal seat assembly configured to be mounted to a rotatable shaft;
    a seal head assembly including:
       (i) a spring seat;
       (ii) a spring having a first end operably disposed against said spring seat;
       (iii) an annular seal ring biased against said seal seat assembly by said spring;
       (iv) a flexible annular boot mounted relative to said spring seat and providing a sealed connection to said seal ring, a first portion of said boot engaged with said seal ring, a second portion of said boot configured to engage with a stationary member, and a third portion of said boot tending to bulge outward and fold over itself during axial compression, said third portion being different from said first and second portions; and (v) a constriction ring surrounding said annular boot and directly engaged with said third portion of said boot, said engagement limiting outward bulging and folding over of said third portion of said boot during axial compression of said boot, wherein said boot radially surrounds an exterior of said spring, said boot has an axial length greater than an axial length of said spring, and said boot extends along said exterior of said spring an entirety of said axial length of said spring.

11. The face seal assembly of claim 10, wherein said seal head assembly is configured to be mounted in a housing which is stationary relative to said seal seat assembly.

12. The face seal assembly of claim 10, wherein said constriction ring has an axial length less than an axial length of said boot and said constriction ring is directly engaged with an axially extending portion of said boot.

13. A face seal assembly for a rotatable shaft, the face seal assembly comprising:
  a seal seat assembly configured to be mounted to a rotatable shaft;
  a seal head assembly including:
    (i) a spring seat;
    (ii) a spring having a first end operably disposed against said spring seat;
    (iii) an annular seal ring biased against said seal seat assembly by said spring;
    (iv) a flexible annular boot mounted relative to said spring seat and providing a sealed connection to said seal ring, a first portion of said boot engaged with said seal ring, a second portion of said boot configured to engage with a stationary member, and a third portion of said boot tending to bulge outward and fold over itself during axial compression, said third portion being different from said first and second portions; and
    (v) a constriction ring surrounding said annular boot and directly engaged with said third portion of said boot, said engagement limiting outward bulging and folding over of said third portion of said boot during axial compression of said boot,
  wherein said boot is disposed between said constriction ring and said seal ring and prevents direct contact between said constriction ring and said seal ring, said boot has an axial length greater than an axial length of said constriction ring between a first end and a second distal end, and said constriction ring is entirely exterior to said spring.

14. A face seal assembly for a rotatable shaft, the face seal assembly comprising:
  a seal seat assembly configured to be mounted to a rotatable shaft;
  a seal head assembly including:
    (i) a spring seat;
    (ii) a spring having a first end operably disposed against said spring seat;
    (iii) an annular seal ring biased against said seal seat assembly by said spring and having a radial exterior surface;
    (iv) a flexible annular boot mounted relative to said spring seat and providing a sealed connection to said seal ring; and
    (v) a one-piece constriction ring directly engaged with and radially surrounding said boot, an entirety of said constriction ring radially surrounds a portion of said radial exterior surface of said seal ring, and an entirety of said constriction ring is exterior to said spring,
  wherein a portion of said boot is radially disposed between said constriction ring and said seal ring and extends along an entire axial portion of said constriction ring adjacent said seal ring thereby preventing direct contact between said constriction ring and said seal ring.

15. The face seal assembly of claim 14, wherein a radially innermost diameter of said constriction ring is greater than a radially outermost diameter of said seal ring.

16. The face seal assembly of claim 14, wherein a portion of said boot tends to bulge radially outwardly and fold upon itself when axially compressed and a portion of said constriction ring limits radially outward bulging and folding of said portion of said boot.

17. The face seal assembly of claim 16, wherein a first axially extending portion and second radially extending portion of said constriction ring limits radially outward bulging and folding of said portion of said boot.

18. The face seal assembly of claim 14, wherein said boot radially surrounds said spring.

19. A face seal assembly for a rotatable shaft, the face seal assembly comprising:
  a seal seat assembly configured to be mounted to a rotatable shaft;
  a seal head assembly including:
    a spring seat;
    a spring having a first end disposed against said spring seat;
    an annular seal ring biased against said seal seat assembly by said spring;
    a flexible annular boot mounted relative to said spring seat and providing a sealed connection to said seal ring, said boot having an axial length; and
    a constriction ring engaging with and surrounding said annular boot, said constriction ring having an axial length between a first end and a second distal end less than said axial length of said boot, and said constriction ring engaging an axially extending portion of said annular boot,
  wherein said constriction ring is entirely exterior to said spring and disposed outside of said boot.

20. A face seal assembly for a rotatable shaft, the face seal assembly comprising:
  a seal seat assembly configured to be mounted to a rotatable shaft;
  a seal head assembly including:
    a spring seat;
    a spring having a first end disposed against said spring seat;
    an annular seal ring biased against said seal seat assembly by said spring;
    a flexible annular boot mounted relative to said spring seat and providing a sealed connection to said seal ring, said boot having an axial length; and
    a constriction ring engaging with and surrounding said annular boot, said constriction ring having an axial length between a first end and a second distal end less than said axial length of said boot, and said constriction ring engaging an axially extending portion of said annular boot,
  wherein an entirety of said constriction ring is disposed outside of said boot and said boot is between said spring and said constriction ring, thereby preventing direct contact between said spring and said constriction ring.

* * * * *